United States Patent [19]

Renfrew et al.

[11] 3,941,560

[45] Mar. 2, 1976

[54] TRISAZO POLYESTER MATERIALS

[75] Inventors: Edgar E. Renfrew, Flemington; Dominic A. Zanella, Lock Haven, both of Pa.

[73] Assignee: American Aniline Products, Inc., Paterson, N.J.

[22] Filed: Dec. 7, 1973

[21] Appl. No.: 422,864

[52] U.S. Cl.................................. 8/41 C; 260/169
[51] Int. Cl.².... D06P 31/20; D05P 1/18; D06P 3/54
[58] Field of Search....................... 8/41 C; 260/169

[56] References Cited
UNITED STATES PATENTS

| | | | |
|---|---|---|---|
| 2,090,938 | 8/1937 | Conrad | 260/169 |
| 2,362,548 | 11/1944 | Gyr | 260/169 |

*Primary Examiner*—Christopher A. Henderson
*Attorney, Agent, or Firm*—Armstrong, Nikaido & Wegner

[57] ABSTRACT

Polyester fibers, particularly poly(ethylene terephthalate), is dyed in bright, fast shades with p,p'''-dihydroxytrisazo compounds.

6 Claims, No Drawings

TRISAZO POLYESTER MATERIALS

BACKGROUND OF THE INVENTION

Although a large amount of research has been conducted into monoazo dyestuffs as colorants for polyesters, and a somewhat lesser degree of exploration has been conducted in the field of disazos, little attention has been focused on the area of trisazos as polyester colors, undoubtedly due to the prejudice against such large molecules as dyestuffs for polyesters. There have been reported in the literature various research efforts in the area of trisazos. Lewcock reports the preparation of a p,p'''-dihydroxytrisazo (*J. Soc. Chem. Ind.*, P.44, 154T). Conrad, U.S. Pat. No. 2,090,938 explored various trisazos based upon naphthalene, which are principally reported as being colorants for oils, fats and waxes, particularly for nitrocellulose lacquers, resins, varnishes, wood stains, printing and stamping inks, artificial leathers, patent leather, shoe polishes and creams, soaps, gasolines and the like. Other related research efforts have been reported in the nineteenth century, including 1892 British complete specification no. 277 and German patents 80,421 and 84,289. In spite of the long history into the exploration of the structures of these compounds going back to the previous century, there has been no interest shown in these dyestuffs for polyester fabrics, undoubtedly because of the large size of these compounds.

It has now been discovered that p,p'''-dihydroxytrisazos produce excellent dyeings on polyester fabrics, particularly poly(ethylene terephthalate) and poly(1,4-cyclohexylenedimethylene)terephthalate.

SUMMARY OF THE INVENTION

In accordance with the invention there is provided polyester fabric material dyed with a trisazo dyestuffs of the formula

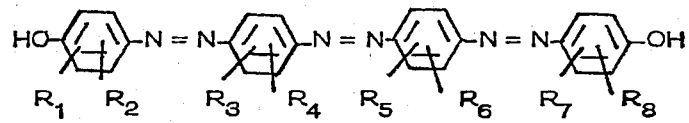

wherein each of $R_1$, $R_2$, $R_7$ and $R_8$ is independently hydrogen, lower alkyl, lower alkoxy, hydroxy, chlorine or bromine; and each of $R_3$, $R_4$, $R_5$ and $R_6$ is independently hydrogen, lower alkyl, lower alkoxy, chlorine or bromine.

DETAILED DESCRIPTION

The trisazo dyestuffs (I) are produced in accordance with known principles of azo chemistry, treating appropriately substituted diazotized bases with couplers in accordance with the following reaction scheme (the parameters being defined as above): The trisazo dyestuffs (I) are produced from the reaction of a tetrazotized base of the formula

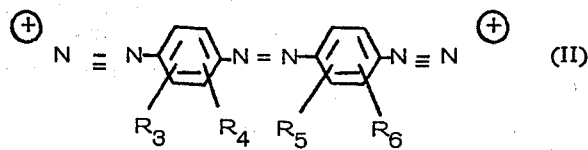

with an equimolar amount of a first coupler of the formula

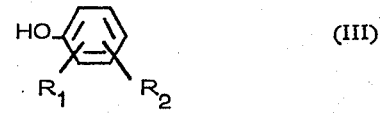

and an equimolar amount of a second coupler of the formula

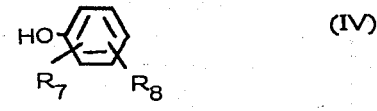

The dyes are conveniently made by tetrazotizing 4,4'-diaminoazobenzenes, which may bear R and $R_2$, but which have no substituent in the para position. If a mixture of phenols is used as the coupler portions $R_1$ and $R_2$ may be varied to $R_7$ and $R_8$.

Suitable 4,4'-diaminoazobenzenes can be made by coupling a diazotized p-nitroaniline which may bear substituents as $R_3$ and $R_4$, into an anilinomethanesulfonic acid which may bear substituents $R_5$ and $R_6$, but not in the para position; the coupled product is hydrolyzed to yield a 4-amino-4'-nitroazobenzene, which is then reduced to the required 4,4'-diaminoazobenzene.

In the definition of the trisazo dyestuffs (I), lower alkyl refers to alkyl of 1 to 4 carbon atoms, preferably methyl and ethyl. Lower alkoxy similarly refers to groups of up to 4 carbon atoms, preferably methoxy and ethoxy.

To prepare the trisazo dyestuffs for application to the polyester substrates noted hereabove, they should be suitably dispersed. This may be done by any of several well-known methods: milling as in a ball-mill with dispersing agents such as lignin sulfonic acid materials, for instance. The resultant aqueous dispersion can be dried, as in a spray-dryer, or preserved and used as a paste. Standardization to any desired lower strength can be done with inert colorless diluents such as inorganic salts for powders, or water for pastes. Other materials such as preservatives, foam-control agents, and melting agents may be added as desired.

Dispersed pastes are made by wet milling the dye in conventional equipment in the presence of a dispersing agent, preferably sodium lignin sulfonate or sodium alkylnaphthalene sulfonate. Various other commercially available dispersing agents, such as sodium salts of carboxylated polyelectrolytes and the naphthalene sulfonates; e.g., the condensation products of sulfonated naphthalene and formaldehyde, such as sodium dinaphthylmethane disulfonate, are conveniently used. The disperse paste may be cut or standardized to a standard strength with water. The final color content of the finished paste averages from 10–40 percent by weight (pure color) active dye base.

Disperse powders are prepared by wet milling color in the presence of a dispersant, such as those mentioned hereabove, in equipment such as a ball mill, Werner-Pfleiderer mill or attritor. The dispersed material is oven or spray dried and micropulverized if necessary to provide the dispersed powder. The color is cut or standardized to a standard strength in a blender with a diluent, such as sodium sulfate or dextrin. A wetting agent, such as sodium cetyl sulfate or an alkylphenoxy polyethanol may be added to aid in wetting out the product when it is placed in the dye bath. Disperse powders are usually cut or standardized to 25-60 percent by weight color content (pure color).

A disperse dye, when added to water with or without auxiliary agents, forms a near colloidal aqueous dispersion from which the aromatic polyester fiber or textile material is dyed in the conventional manner at 40°–100°C (104°–212°F) to give a colored fiber containing about 0.01–2 percent by weight dye (100% color basis).

Alternatively, dyeing may be accomplished without a carrier at temperatures of 100°–150°C under pressure. Also, the dye may be applied in patterns by conventional printing methods, if desired.

The dye can also be applied to the aromatic polyester fiber by thermofixation methods, such as the "Thermosol" process. This process, which involves padding the cloth with the diluted dye dispersion followed by drying and heating with dried hot air or heated contact rolls, is conveniently used for dyeing polyester fibers and blends containing these fibers. Fixation temperatures of 180°–220°C (356°–428°F) are used for 30 to 90 seconds. If the fabric contains cotton or viscose rayon, apart from synthetic fibers, there is little danger of damaging cellulosic portions, but if wool is present, the temperature must be kept within 180°–200°C and the time must be reduced to 30 seconds.

In order to evaluate the effectiveness of a particular dye for a given type of fiber, the dyed fiber is examined for substantivity of the color, light fastness of the color, and resistance of the color to sublimation.

It should be particularly noted that although the molecules are larger in size than most of the azo or disazo dyes proposed heretofore, they are unexpectedly substantive; the dyeings are of acceptable strengths and exhibit good build-up properties. The dyeings have excellent fastness characteristics, particularly with respect to sublimation fastness.

The following examples serve to further illustrate the invention:

EXAMPLE 1

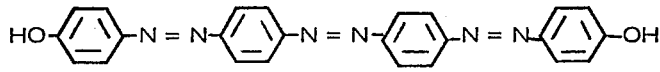

To a 3-l. beaker is charged
800 ml. water
2.5 g. "Tween 20" (a commercially available surface active material)
108.0 g. hydrochloric acid (32%) and
42.2 g. 4,4'-diaminoazobenzene.

The mixture is stirred at 45° for one hour, after which ice is added to bring the temperature to 0°C at 0°–5°C, over one-half hour, is added dropwise a solution of
29.0 g. sodium nitrite in
100.0 ml. water.

Stirring is continued at 0°–5°C for another 1½ hours. Excess nitrous acid is removed by adding enough sulfamic acid, and the cold tetrazonium salt is clarified through a chilled filter coated with a diatomaceous earth filter aid. The clarified solution is kept cold.

To a battery jar is charged
1000 ml. water at 60°C, and
40.0 g. phenol. After a short period of stirring,
53.0 g. sodium carbonate is added. Stirring is continued until a solution results. Ice is added to bring the temperature to 0°–5°C.

The solution of sodium phenoxide is added to the stirred tetrazonium salt solution containing enough ice so that the temperature does not rise significantly above 5°–10°C. Stirring is continued for 16 hours during which time the temperature is allowed to rise spontaneously to that of the room.

The solid trisazo material is isolated by suction filtration and washed neutral on the filter with water, and sucked dry. It may be dried in an oven, or preferably maintained as a wet cake. The (dry) yield is 58 g.

The material is dispersed by milling in a ball mill with an equal weight of a sodium lignosulfonate dispersing agent ("Marasperse CB") and enough water, including that charged with the filter cake, to give a paste of 15% color content.

Dyeings on poly(ethylene terephthalate) fiber are clear yellowish orange. Properties, especially to sublimation and light fastness tests, are excellent.

EXAMPLE 2

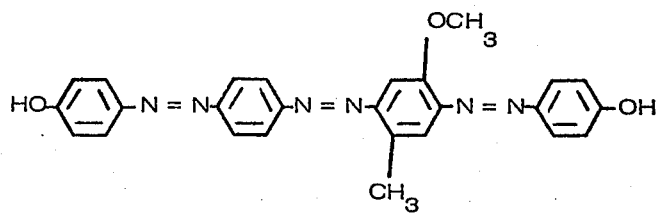

In the manner of Example 1, but using 51.2 g. of 4,4'-diamino-2-methoxy-5-methylazobenzene instead of 4,4'-diaminoazobenzene, a trisazo dye of the indicated structure is made. It yields, after dispersion and dyeing on poly(ethylene terephthalate) fibers reddish orange shades of excellent properties.

EXAMPLE 3

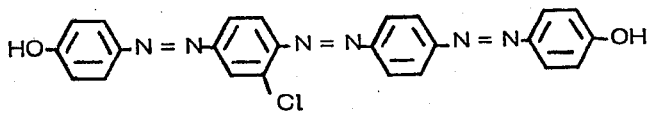

In the manner of Example 1, but using 49.3 g. 3-chloro-4,4'-diaminoazobenzene instead of 4,4'-diaminoazobenzene, a dye yielding excellent orange dyeings on polyester is made.

EXAMPLE 4

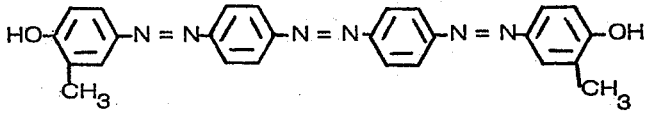

In the manner of Example 1, but using 45.5 g. o-cresol instead of phenol, a dye of the indicated structure is made. It yields orange dyeings of good properties on poly(ethylene terephthalate) fibers.

EXAMPLE 5

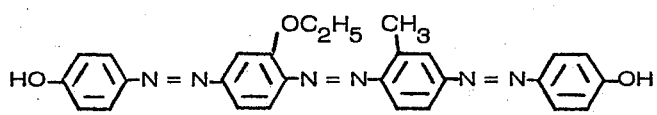

In the manner of Example 1, but using 54.0 g. of 4,4'-diamino-2-ethoxy-2'-methylazobenzene instead of 4,4'-diaminoazobenzene, a material of the indicated structure is obtained. Dyeings on polyester from it are yellowish-red in hue and show excellent fastness properties.

4,4'-Diamino-2-ethoxy-2'-methylazobenzene is made by coupling 4-nitro-2-phenetidine with m-toluidinomethanesulfonic acid, hydrolyzing the coupled material to 4-amino-2-ethoxy-2-methyl-4'-nitroazobenzene, followed by reduction of the nitro group to amino.

EXAMPLES 6 – 10

In the manner of Example 1, are made trisazo dyes of the following structures and hues. Properties of dyed polyester are excellent, especially the fastness to light and sublimation. The dyes are particularly suitable for dying poly(ethylene terephthalate) by the "Thermosol" method.

| Ex. | $R_1$ | $R_2$ | $R_3$ | $R_4$ | $R_5$ | $R_6$ | $R_7$ | $R_8$ | Hue |
|---|---|---|---|---|---|---|---|---|---|
| 6 | 3-Cl | H | H | H | H | H | 3'''-Cl | H | Brown |
| 7 | 3-CH$_3$ | 5-CH$_3$ | H | H | H | H | 3'''-CH$_3$ | 5'''-CH$_3$ | Yellow-Brown |
| 8 | H | H | 2'-Cl | 6'-Cl | H | H | H | H | Orange |
| 9 | 2-OH | H | H | H | H | H | 2'''-OH | H | Red |
| 10 | 2-OH | H | H | H | H | H | H | H | Reddish-orange |

What is claimed is:

1. A aromatic polyester fabric material dyed with a compound of the formula

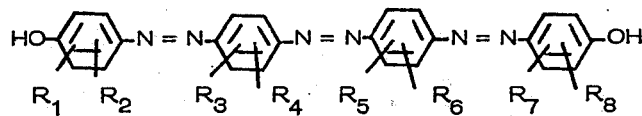

wherein each of $R_1$, $R_2$, $R_7$ and $R_8$ is independently hydrogen, lower alkyl, lower alkoxy, hydroxy, chlorine or bromine; and
each of $R_3$, $R_4$, $R_5$ and $R_6$ is independently hydrogen, lower alkyl, lower alkoxy, chlorine or bromine.

2. The aromatic polyester fabric material of claim 1 wherein $R_2$ and $R_8$ are hydrogen.

3. The aromatic polyester fabric material of claim 2, wherein $R_6$ is hydrogen.

4. The aromatic polyester fabric material of claim 3, wherein $R_1$ and $R_7$ are independently hydrogen, hydroxy, methyl, ethyl, methoxy, ethoxy, chloro or bromo; and each of $R_3$, $R_4$ and $R_5$ is independently hydrogen, methyl, ethyl, propyl, methoxy, ethoxy, bromo or chloro.

5. The aromatic polyester fabric material of claim 1, wherein $R_1$, $R_2$, $R_6$, $R_7$ and $R_8$ are hydrogen; $R_3$ and $R_4$ are hydrogen, lower alkyl or lower alkoxy; and $R_5$ is hydrogen, lower alkoxy or chloro.

6. The aromatic polyester fabric material of claim 1 wherein $R_1$, $R_2$, $R_3$, $R_4$, $R_5$, $R_6$, $R_7$ and $R_8$ are hydrogen.

* * * * *